(12) United States Patent
Hill

(10) Patent No.: US 10,227,772 B1
(45) Date of Patent: Mar. 12, 2019

(54) POST-TO-BEAM CONNECTOR ASSEMBLY

(71) Applicant: Oz-Post International, LLC, Richardson, TX (US)

(72) Inventor: Ian A. Hill, Plano, TX (US)

(73) Assignee: Oz-Post International, LLC, Richardson, TX (US)

( * ) Notice: Subject to any disclaimer, the term of this patent is extended or adjusted under 35 U.S.C. 154(b) by 0 days.

(21) Appl. No.: 15/842,104

(22) Filed: Dec. 14, 2017

(51) Int. Cl.
| *E04B 1/41* | (2006.01) |
| *E04C 3/00* | (2006.01) |
| *E04B 1/38* | (2006.01) |
| *E04H 17/14* | (2006.01) |
| *F16B 7/04* | (2006.01) |
| *E04B 1/26* | (2006.01) |

(52) U.S. Cl.
CPC .................. *E04B 1/40* (2013.01); *E04C 3/00* (2013.01); *E04B 1/2604* (2013.01); *E04B 2001/405* (2013.01); *E04H 17/1421* (2013.01); *F16B 7/044* (2013.01)

(58) Field of Classification Search
CPC ......... Y10T 403/3906; Y10T 403/3913; Y10T 403/7105; Y10T 403/4605; Y10T 403/7194; Y10T 403/73; Y10T 403/52; E04H 17/1421; E04H 17/1434; E04H 17/1443; E04H 2017/1447; E04H 2017/1482; E04H 12/2253; E04H 12/2292; E04H 12/2261; E04H 12/2269; F16B 7/042; F16B 7/0493; F16B 7/044; F16B 9/052; G09F 2007/1804; G09F 2007/1813; E04C 1/39; E04C 3/125; E04C 3/30; E04B 1/2604; E04B 1/2608; E04B 2001/2415; E04B 7/045; E04B 1/26; E04B 7/04; E04F 15/02452; E04F 15/02464
USPC .... 52/297, 298, 713, 655.1, 92.2, 93.1, 93.2
See application file for complete search history.

(56) References Cited

U.S. PATENT DOCUMENTS

| 1,423,991 | A | * | 7/1922 | Brooks | E04F 21/05 52/370 |
| 2,317,125 | A | * | 4/1943 | Barnett | E04B 1/2608 403/190 |
| 2,666,238 | A | * | 1/1954 | Hagedorn | E04B 1/2608 403/189 |
| D254,476 | S | | 3/1980 | Gilb | |
| 4,313,688 | A | * | 2/1982 | Daniels | E04B 1/2608 403/189 |
| 4,900,183 | A | * | 2/1990 | Souchko | A63H 33/106 403/385 |

(Continued)

Primary Examiner — Robert Canfield
Assistant Examiner — Matthew J Gitlin
(74) Attorney, Agent, or Firm — Foley & Lardner LLP

(57) ABSTRACT

A connector assembly for structural members includes a support plate that has a primary portion and a first tab portion extending from the primary portion. A second tab portion also extends from the primary portion, and the primary portion defines at least one through hole that is configured to receive a fastener. A first stirrup plate defines a first slot that is configured to receive the first tab portion such that the first stirrup plate extends from the support plate in a first direction. The first stirrup plate further defines at least one through hole that is configured to receive a fastener. A second stirrup plate defines a second slot that is configured to receive the second tab portion such that the second stirrup plate extends from the support plate in a second direction opposite the first direction.

18 Claims, 2 Drawing Sheets

(56) References Cited

U.S. PATENT DOCUMENTS

| | | | |
|---|---|---|---|
| 4,924,648 A | | 5/1990 | Gilb et al. |
| 5,307,603 A | * | 5/1994 | Chiodo ................. E04B 1/2608 52/297 |
| 5,794,395 A | | 8/1998 | Reed |
| 7,243,473 B2 | | 7/2007 | Terrels |
| 7,677,522 B2 | | 3/2010 | Bakos |
| 7,992,362 B2 | | 8/2011 | Petta |
| 8,782,978 B1 | | 7/2014 | Frenette et al. |
| 9,010,062 B2 | * | 4/2015 | Hill ........................ E04B 1/1903 403/205 |
| 9,027,897 B2 | * | 5/2015 | Hill ........................ F16M 13/00 248/346.01 |
| 2002/0139069 A1 | | 10/2002 | Buffkin et al. |
| 2004/0206028 A1 | | 10/2004 | Terrels et al. |
| 2008/0283702 A1 | | 11/2008 | Ikerd |
| 2013/0146606 A1 | | 6/2013 | Blay Orenga et al. |
| 2016/0319564 A1 | * | 11/2016 | Lavery ................. E04H 12/2292 |

* cited by examiner

POST-TO-BEAM CONNECTOR ASSEMBLY

CROSS-REFERENCE TO RELATED APPLICATIONS

This application is subject matter related to U.S. Pat. No. 9,027,897, entitled "Standoff Connector for Use, for Example, as a Post Base," filed on Jun. 14, 2013, which claims priority from U.S. Provisional Application for Patent No. 61/660,871 filed Jun. 18, 2012, the disclosures of which are incorporated by reference.

BACKGROUND OF THE INVENTION

Technical Field of the Invention

The present invention relates generally to devices for joining structural members, and particularly to devices that are adjustable to allow joining of structural members having various actual sizes.

Description of Related Art

Many construction projects require the attachment of a horizontally extending structural member to a side surface of a vertically extending structural member.

Conventional post-to-beam connectors are typically manufactured with sizes specifically selected for commonly used dimensional structural members (i.e., dimensional lumber). It is known in the art that the stated dimensional size of a wood structural member is not the actual dimensional size. For example, a 2×6 wood beam will not typically measure two actual inches in thickness and six actual inches in width. This is especially the case when the wood structural member is something other than "rough cut" (where rough cut members more conventionally are dimensionally accurate or close to dimensionally accurate). The differences in size may, for example, be geographic such that a 2×6 wood beam in one geographic region is one size and a 2×6 wood beam in another geographic region is another size. Alternatively, the differences in size may vary from lumber mill to lumber mill, or vary depending on the treatment made to the wood. It is not uncommon for a "2×6" wood beam to have thicknesses varying from 1.5 to 2.0 inches and widths varying from 5.5 inches to 6.0 inches. The conventional post-to-beam connectors, constructed solely for commonly encountered dimensions, are not well suited to handle the dimensional variability of structural members, and in particular are not configured to adjust to differences in thickness.

SUMMARY

In accordance with an embodiment, a connector assembly for structural members includes a support plate that has a primary portion and a first tab portion extending from the primary portion. A second tab portion also extends from the primary portion, and the primary portion defines at least one through hole that is configured to receive a fastener. A first stirrup plate defines a first slot that is configured to receive the first tab portion such that the first stirrup plate extends from the support plate in a first direction. The first stirrup plate further defines at least one through hole that is configured to receive a fastener. A second stirrup plate defines a second slot that is configured to receive the second tab portion such that the second stirrup plate extends from the support plate in a second direction opposite the first direction. The second stirrup plate further defines at least one through hole that is configured to receive a fastener.

Technical advantages include a post-to-beam connector assembly that is easily manufactured from sheet metal and is adjustable to accommodate pieces of lumber having various actual sizes despite the dimensional label of the lumber designated by the suppliers.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
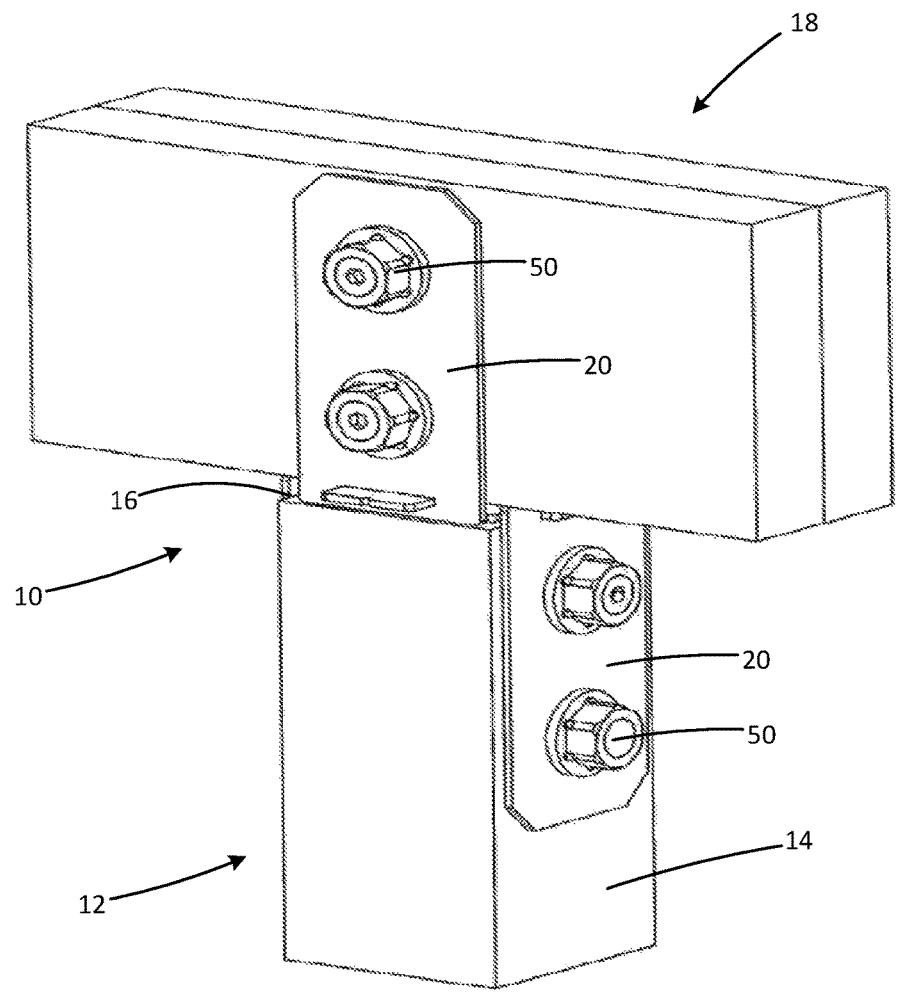
FIG. 1 is an environmental, isometric view of a post-to-beam connector according to the teaching of the present disclosure.
Figure 2:
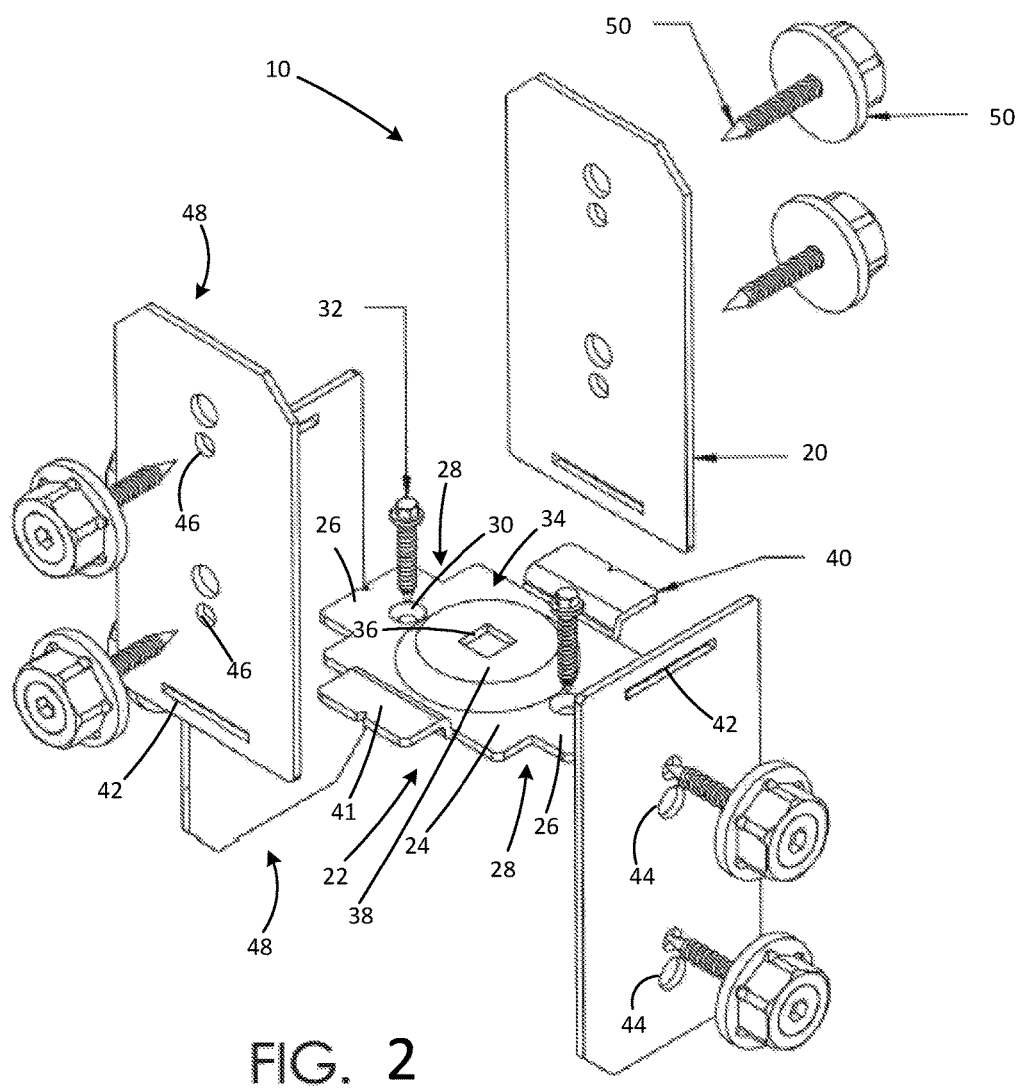
FIG. 2 is an exploded, isometric view of the post-to-beam connector of FIG. 1.

Reference is made to FIGS. 1 and 2. FIG. 1 shows a perspective, environmental view of a post-to-beam connector assembly 10. FIG. 2 shows a perspective, exploded view of the post-to-beam connector assembly 10. According to the teachings of the present disclosure, the post-to-beam connector assembly is size adjustable to accommodate lumber cuts of different sizes, as explained in more detail below. The post-to-beam connector assembly 10 may also be referred to as a column cap or a post cap because it may be employed in wooden structures on a top end of vertical support post, which may be referred to as a column.

A lower end of a vertical support member 12, for example a structural post or column, is coupled to a foundation. The vertical support member 12 may be a component of a wooden structure, for example an outdoor structure such as a pergola or gazebo. A plurality of vertical support members 12 structurally support a roof or other structure disposed above the foundation. The vertical support member 12 includes a plurality of side surfaces 14 and a top end surface 16. According to one embodiment, the vertical support member 12 is a 4×4 wood post with a square cross section. According to an alternate embodiment, the vertical support member 12 is a 6×6 wood post with a square cross section. In order for the vertical support member 12 to provide robust support for a cross beam 18, the cross beam 18 is positioned to be supported by the top end 16 of the vertical support member 12. The top end surface 16 is parallel with a base surface disposed opposite the top end surface 16. The base surface may be secured to a post base that is itself secured to a concrete slab or other foundation.

The illustrated cross beam 18 is formed of two 2×6 pieces of lumber. Other sizes of lumber are contemplated by this disclosure. A plurality of stirrup plates 20 are fastened to the side surfaces 14 of the vertical support member 12, and a plurality of stirrup plates 20 are also fastened to the cross beam 18. All of the stirrup plates 20 are coupled to a common support plate 22, as shown in FIG. 2. For connections that are required to be less robust, only one stirrup plate 20 may be fastened to the vertical support member 12 and one stirrup plate 20 may be fastened to the cross beam 18.

The stirrup plate 20 (and optionally the support plate 22) may be powder coated or otherwise finished to present an attractive aesthetic appearance over raw sheet metal, which may be unsightly and require construction of a concealment structure.

The support plate 22 is generally formed of steel or other strong metal. A blank sheet of steel may be punched, bent, drilled, and the like to form the features of the support plate 22. The support plate 22 includes a primary surface 24. The primary surface 24 defines a pair of tab portions 26. One tab portion 26 extends a first direction from the support plate 22 and a second tab portion 26 extends a second direction opposite the first direction from the support plate 22. The tab portions 26 are formed by removing material from the support plate 22 to form notches 28 that are disposed on each side of respective tab portions 26.

A pair of through holes 30 is formed in the primary surface 24. The through holes 30 are each configured to receive a mounting device 32. According to certain embodiments, the through holes 30 may be countersunk. In other embodiments, the through holes 30 are not countersunk. The mounting devices 32 may be any mounting device suitable to penetrate the material of the vertical support member 12. For example, the mounting devices may be hex-head wood screws. According to an alternate embodiment, the mounting devices may be nails. The mounting devices 32 penetrate the top end surface 16 to secure the support plate 22 to the top end surface 16 of the vertical support member 12.

A protrusion 34 extends upward from the primary surface 24. From an opposite side of the support plate 22, the protrusion 34 is a dimple. The protrusion 34 may include a through hole 36 that is generally not configured to receive a mounting device. The protrusion 34 defines a beam support surface 38. The beam support surface 38 is elevated such that when the cross beam 18 is supported by the support surface, the beam 18 clears the mounting devices 32 if they are not countersunk.

A pair of elevated tab portions 40 extends from the support plate 22. One elevated tab portion 40 extends in a first direction and second elevated tab portion 40 extends in a second opposite direction. An upper surface 41 of the elevated tab portion 40 may be even with the beam support surface 38. The elevated tab portions 40 are formed by bending the steel blank upward, then bending the upwardly bent portion 90 degrees to extend away from the support plate 22. According to an alternate embodiment, the tab portions 40 may not be elevated, and instead may be level with the tab portions 26.

It is known in the art that the stated dimensional size of wood structural members, such as the vertical support post 12, is not the actual dimensional size. For example, a 6×6 wood post will not typically measure six actual inches on each side. This is especially the case when the wood structural member is something other than "rough cut" (where rough cut members more conventionally are dimensionally accurate or close to dimensionally accurate). The differences in size may, for example, be geographic such that a 6×6 wood post in one geographic region is one size and a 6×6 wood post in another geographic region is another size. Alternatively, the differences in size may vary from lumber mill to lumber mill, or vary depending on the treatment made to the wood. It is not uncommon for a "6×6" wood post to have sides varying from 5.5 inches to 6.0 inches. It is also not uncommon for a square wood structural member to have a non-square cross-section. The post-to-beam connector assembly 10 accommodates the foregoing dimensional variability issues.

The support plate 22 may be sized relative to the vertical support post 12 to which it is being secured. For example, one size support plate 22 may be used on a 4×4 post, a larger size may be used on a 6×6 post, and an even larger size may be used with and 8×8 post. The support plate 22 is accordingly sized to support the highest expected dimensional size for the vertical support member 12. Thus, for use in connection with a 6×6 vertical support member, the support plate 22 is sized with a supporting footprint including the tab portions 26, 40 that is slightly larger than 6×6. The tab portions 26 are sized to support the smallest expected dimensional size for the vertical support post 12. Thus, for use in connection with a 6×6 wood structural member, tab portions 26 match the 5.5×5.5 inch actual size of the 6×6 wood structural member. With this configuration, the tab portions 26 extend a length of approximately 0.5 inches, but may extend as far as 0.75 inches. The dimensions of the tab portions 26 permit a range of adjustment in the positioning of the selectably installed stirrup plates 20 so that the stirrup plate plates 20 can be positioned flush against the side surfaces 14 of the vertical support member 12, despite variability in its actual dimensional size.

The tab portions 40 accommodate dimensional variability in the cross beams 18 similar to that described above with respect to the dimensional variability of the vertical support member 12. The post-to-beam connector assembly 10 may also be sized to accommodate various actual dimensions of an 8×8 inch post.

The support plate 22 is formed of sheet metal, for example ASTM A36 steel. The support plate 22 is formed using sheet metal forming processes, such as bending to form elevated tab portions 40 and stamping to form the protrusion 34, the notches 28, and the through holes 30. The sheet metal used to form the support plate 22 is a sheet of steel having a thickness in a range of 2-5 millimeters (0.08-0.20 inches), for example 3 millimeters (0.12 inches). According to certain embodiments, the thickness of the steel can be up to 6.35 millimeters (0.25 inches).

Each of the tab portions 26 are received in a slot 42 formed in a stirrup plate 20. The stirrup plates 20 are oriented to extend downward from the support plate 22 such that they may be fastened to the side surfaces 14 of the vertical support member 12. Each of the elevated tab portions 40 are received in a slot 42 formed in a stirrup plate 20, and the stirrup plates 20 are oriented upward away from the support plate 22 such that they may be fastened to the cross beam 18. Around the perimeter of the support plate 22 one stirrup plate 20 is oriented upward and the two stirrup plates positioned adjacent to it are oriented downward. According to an alternate embodiment, the stirrup plates 20 that receive the elevated tab portions 40 are oriented downward, and the stirrup plates that receive the tab portions 26 are oriented upward.

According to an embodiment, the stirrup plate 20 is formed from a piece of sheet metal, for example ASTM A36 steel that has a thickness in a range of 2-5 millimeters (0.08-0.20 inches), for example 3 millimeters (0.12 inches). According to certain embodiments, the thickness of the steel can be up to 6.35 millimeters (0.25 inches).

A central portion of each stirrup plate member 20 includes a plurality of mounting openings 44. The mounting openings are configured to receive a mounting device 50 (such as a screw or bolt) for attaching the stirrup plate member 20 to a side surface 14 of the vertical support member 12 and the cross beam 18 (FIG. 1). The mounting openings comprise a first pair of openings 44 and a second pair of openings 46. The first pair of openings are disposed closer to an ornamental end 48 than the second pair of mounting openings 44. According to one embodiment, the first pair of mounting openings 44 may be larger or smaller than the second pair of mounting openings 46. To hide the unused pair of openings, the mounting devices 80 may be sized cover both pairs of openings when installed, or may use other techniques, such as a washer or other structure, sized sufficient to cover both pairs of openings.

Mounting devices 50 are then inserted through one or more of the mounting openings 44, 46 of each stirrup plate 20 and driven into the side of the vertical support member 12 and the cross beam 18. One example of a mounting device 50 is the ornamental mounting hardware described in U.S. Pat. No. 9,133,874 to Hill, which is incorporated by reference. The interlocking of the stirrup plates 20 and the support plate 22 through the tab portions 26, 40 and the slots 42 structurally joins the cross beam 18 to the vertical support member 12.

According to one embodiment, an upper portion 48 of each stirrup plate 20 may include a variety of ornamental features. Examples of ornamental designs for the upper portion 48 are described in U.S. Pat. No. 9,027,897 to Hill, which is incorporated by reference. Such variety in ornamental design, while retaining a common design and placement of the slots 42, allows for the stirrup plates 20 to be interchanged. Such an interchange may occur in connection with a renovation where the architectural and ornamental style of the construction changes. New stirrup plates 20 matching the new architectural and ornamental style, can be easily installed without requiring that the vertical support member 12 or the cross member 18 be changed.

The stirrup plates 20 are laterally positionable, toward and away from a center of the support plate 22. To address the issue of dimensional variability with respect to the cross beam 18 and the vertical support member 12, the tab portions 40 are sized to support a range from the largest to the smallest expected dimensional thickness for the cross beam 18. Thus, when a thicker cross beam 18 is used, the tab portions 40 will still engage the slots 42. However, when a thinner cross beam 18, the tab portions 40 will pass further through the slots 42 to accommodate the thinner cross beam 18 while maintaining a flush attachment of the stirrup plate 20 to the side surface of the cross beam 18. In an implementation, the elevated tab portions 40 may present a tab length of about 0.5 inches. This tab length permits a range of adjustment interlocked positioning of the stirrup plate 20 relative to the support plate 22, more specifically the tab portions 40 of the support plate 22 so that the stirrup plate 20 is positioned flush against the side surface of the cross beam member 18, despite variability in its actual dimensional size.

Similarly, the tab portions 26 are sized to support a range from the largest to the smallest expected dimensional thickness for the vertical support member 12. Thus, when a larger vertical support member 12 is used, the tab portions 26 will still engage the slots 42. However, when a smaller vertical support member 12 is used, the tab portions 40 will pass further through the slots 42 to accommodate the smaller vertical support member 12 while maintaining a flush attachment of the stirrup plate 20 to the side surface 14 of the vertical support member 12. In an implementation, the tab portions 26 may present a tab length of about 0.5 inches. This tab length permits a range of adjustment interlocked positioning of the stirrup plate 20 relative to the support plate 22, more specifically the tab portions 26 of the support plate 22 so that the stirrup plate is positioned flush against the side surface of the vertical support member 12, despite variability in its actual dimensional size.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A connector assembly for structural members, comprising:
   a support plate having a primary portion and a first tab portion extending from the primary portion and a second tab portion extending from the primary portion, the primary portion defining at least one through hole configured to receive a fastener;
   a first stirrup plate defining a first slot configured to receive the first tab portion and extending from the support plate in a first direction, the first stirrup plate further defining at least one through hole configured to receive a fastener;
   a second stirrup plate defining a second slot configured to receive the second tab portion and extending from the support plate in a second direction opposite the first direction, the second stirrup plate further defining at least one through hole configured to receive a fastener; and
   wherein the first stirrup plate is laterally movable along the first tab portion and the second stirrup plate is laterally movable along the second tab portion independently of the first stirrup plate.

2. The connector assembly of claim 1 wherein the support plate further comprises a protrusion defining a support surface.

3. The connector assembly of claim 1 wherein the first tab portion and the second tab portion each extend approximately 0.5 inches from the primary portion of the support plate.

4. The connector assembly of claim 1 wherein the support plate further comprises a protrusion defining a support surface and the first tab portion is level with the support surface.

5. The connector assembly of claim 1 where in the first tab portion is elevated with respect to the second tab portion.

6. A post-to-beam connector, comprising:
   a support plate comprising a first pair of opposed tab portions, a second pair of opposed tab portions, and at least one through hole configured to receive a fastener;
   a first pair of stirrup plates each defining a first slot configured to receive a respective one of the first pair of opposed tab portions and extending in a first direction from the support plate, each of the first pair of stirrup plates defining at least one through hole configured to receive a fastener;
   a second pair of stirrup plates each defining a second slot configured to receive a respective one of the second pair of opposed tab portions and extending from the support plate in a second direction opposite the first direction, each of the second pair of stirrup plates defining at least one through hole configured to receive a fastener; and
   wherein each of the first pair of stirrup plates is laterally movable along the respective one of the first pair of opposed tab portions and each of the second pair of stirrup plates is laterally movable along the respective one of the second pair of opposed tab portions independently of each of the first pair of stirrup plates.

7. The post-to-beam connector of claim 6 wherein the support plate further comprises a protrusion defining a support surface.

8. The post-to-beam connector of claim 6 wherein each of the first pair of opposed tab portions extends approximately 0.5 inches from a primary portion of the support plate.

9. The post-to-beam connector of claim 6 wherein each of the second pair of opposed tab portions extends approximately 0.5 inches from a primary portion of the support plate.

10. The post-to-beam connector of claim 6 wherein the support plate further comprises a protrusion defining a support surface and the first pair of opposed tab portions are level with the support surface.

11. The post-to-beam connector of claim 6 where in the first pair of opposed tab portions are elevated with respect to the second pair of opposed tab portions.

12. An assembly joining structural members, comprising:
a vertical support post having a plurality of side surfaces and a top end surface;
a support plate disposed on the top end surface of the vertical support post, the support plate having a primary portion and a first tab portion extending from the primary portion and a second tab portion extending from the primary portion, the primary portion defining a pair of through holes each receiving a fastener penetrating the top end surface;
a cross beam disposed on the support plate;
a first stirrup plate extending in a first direction and defining a first slot receiving the first tab portion and at least one through hole receiving a fastener penetrating one of the side surfaces of the vertical support post;
a second stirrup plate extending in a second direction opposite the first direction and defining a second slot receiving the second tab portion and at least one through hole receiving a fastener penetrating the cross beam; and
wherein the first stirrup plate is laterally movable along the first tab portion to allow the first stirrup plate to contact the one of the side surfaces of the vertical support post having various actual sizes, and the second stirrup plate is laterally movable along the second tab portion independently of the first stirrup plate to allow the second stirrup plate to contact the cross beam having various actual sizes.

13. The assembly of claim 12 wherein the vertical support post is a 4×4 piece of lumber and the first and second tab portions are sized to allow the first and second stirrup plates to contact the side surfaces of the 4×4 piece of lumber of various actual sizes.

14. The assembly of claim 12 wherein the vertical support post is a 6×6 piece of lumber and the first and second tab portions are sized to allow the first and second stirrup plates to contact the side surfaces of the 6×6 piece of lumber of various actual sizes.

15. The assembly of claim 12 wherein the support plate further comprises a protrusion defining a support surface.

16. The assembly of claim 12 wherein the first tab portion and the second tab portion each extends approximately 0.5 inches from the primary portion of the support plate.

17. The assembly of claim 12 wherein the support plate further comprises a protrusion defining a support surface and the first tab portion is level with the support surface.

18. The assembly of claim 12 where in the first tab portion is elevated with respect to the second tab portion.

* * * * *